United States Patent
Peljo et al.

(10) Patent No.: US 11,999,459 B2
(45) Date of Patent: Jun. 4, 2024

(54) CYCLOIDAL MARINE PROPULSION UNIT AND A MARINE VESSEL EQUIPPED THEREWITH

(71) Applicant: ABB Oy, Helsinki (FI)

(72) Inventors: Veli-Pekka Peljo, Helsinki (FI); Lauri Lampen, Helsinki (FI); Sami Nivala, Espoo (FI); Petri Pellinen, Helsinki (FI); Aki Maksimainen, Helsinki (FI)

(73) Assignee: ABB Oy, Helsinki (FI)

( * ) Notice: Subject to any disclaimer, the term of this patent is extended or adjusted under 35 U.S.C. 154(b) by 355 days.

(21) Appl. No.: 17/413,050

(22) PCT Filed: Dec. 14, 2018

(86) PCT No.: PCT/FI2018/050917
§ 371 (c)(1),
(2) Date: Jun. 11, 2021

(87) PCT Pub. No.: WO2020/120824
PCT Pub. Date: Jun. 18, 2020

(65) Prior Publication Data
US 2022/0048607 A1 Feb. 17, 2022

(51) Int. Cl.
*B63H 23/04* (2006.01)
*B63H 1/06* (2006.01)
(Continued)

(52) U.S. Cl.
CPC ............... *B63H 23/04* (2013.01); *B63H 1/06* (2013.01); *B63H 21/17* (2013.01); *B63H 21/386* (2013.01);
(Continued)

(58) Field of Classification Search
CPC .......... B63H 23/04; B63H 1/06; B63H 21/17; B63H 21/386; B63H 2001/105;
(Continued)

(56) References Cited

U.S. PATENT DOCUMENTS

| 1,823,169 A | 9/1931 | Ernst et al. |
| 5,462,406 A | 10/1995 | Ridgewell et al. |

FOREIGN PATENT DOCUMENTS

| CN | 102001434 A | 4/2011 |
| CN | 102351038 A | 2/2012 |

(Continued)

OTHER PUBLICATIONS

International Search Report and Written Opinion of the International Searching Authority; Application No. PCT/FI2018/050917; Completed: Jul. 17, 2019; dated Jul. 24, 2019; 11 Pages.
(Continued)

*Primary Examiner* — Anthony D Wiest
(74) *Attorney, Agent, or Firm* — Whitmyer IP Group LLC (57) ABSTRACT

A cycloidal marine propulsion unit, including a hollow rotary casing having a central axis and defining a central inner space with an opening at an axial end thereof. A mounting body rotatably supports the rotary casing on a hull of a marine vessel. A rotating arrangement is provided for rotating said hollow rotary casing, while a plurality of blades extend axially from the rotary casing away from the hull. Each blade is mounted for pivotal movement with respect to the rotary casing, about respective blade axes. The rotating arrangement is configured to rotate the rotary casing by a circumference thereof. A blade shaft portion of each blade is at least partly received within the central inner space so as to attach said blade to the rotary casing.

18 Claims, 8 Drawing Sheets

(51) Int. Cl.
　　　*B63H 21/17*　　(2006.01)
　　　*B63H 21/38*　　(2006.01)
　　　*F16C 33/72*　　(2006.01)
　　　*H02K 7/08*　　(2006.01)
　　　*H02K 7/116*　　(2006.01)
　　　*H02K 9/19*　　(2006.01)
　　　*H02K 11/33*　　(2016.01)

(52) U.S. Cl.
　　　CPC ............. *F16C 33/72* (2013.01); *H02K 7/085* (2013.01); *H02K 7/116* (2013.01); *H02K 9/19* (2013.01); *H02K 11/33* (2016.01)

(58) Field of Classification Search
　　　CPC ....... B63H 1/10; B63B 17/0018; F16C 33/72; H02K 7/085; H02K 7/116; H02K 9/19; H02K 11/33
　　　See application file for complete search history.

(56) References Cited

FOREIGN PATENT DOCUMENTS

| | | |
|---|---|---|
| CN | 104333172 A | 2/2015 |
| CN | 105083514 A | 11/2015 |
| CN | 105083515 A | 11/2015 |
| CN | 107108004 A | 8/2017 |
| CN | 107246395 A | 10/2017 |
| DE | 2535570 A1 | 2/1977 |
| DE | 20117451 U1 | 4/2002 |
| DE | 102005022168 A1 | 11/2006 |
| EP | 2944556 A1 | 11/2015 |
| EP | 3399184 A1 | 11/2018 |
| FR | 906896 A | 2/1946 |
| GB | 2391845 A | 2/2004 |
| RU | 2670364 C1 | 10/2018 |
| WO | 0001575 A2 | 1/2000 |
| WO | 2017021844 A1 | 2/2017 |

OTHER PUBLICATIONS

Chinese Office Action and Search Report; Application No. 201880100685.3; Completed: Mar. 27, 2023; 11 Pages.

CYCLOIDAL MARINE PROPULSION UNIT AND A MARINE VESSEL EQUIPPED THEREWITH

TECHNICAL FIELD

The present disclosure relates to propulsion units for marine vessels, and more particularly to cycloidal marine propulsion units. The present disclosure further concerns marine vessels equipped with such a cycloidal marine propulsion unit.

BACKGROUND

Cycloidal propulsion, often referred to as cyclorotor propulsors or Voith-Schneider propulsors, have typically been used for marine propulsion in applications requiring high manoeuvrability.

Typically, such propulsion units comprise a rotatable disk, onto which a plurality of vertically extending blades rotated along a rotor disk, while the pitch angle of the blades is changed based on the rotational position of the blade in order to achieve thrust in a desired direction. In conventional arrangements, both the rotating plate and the blades have been actuated by a prime mover, such as a diesel engine, coupled with mechanical power transmission means. Cycloidal propulsion provides good manoeuvrability for marine vessels and has thus been used in applications such as tugboats, ferries and offshore drilling boats.

Recently also electrically driven arrangements have been considered, as improved control and efficiency may be achieved. As a result, cycloidal propulsion has become a feasible option for marine vessels in applications previously considered unsuitable or uneconomical. For example, publication EP 2 944 556 A1 discloses an electrically driven cycloidal marine propulsion unit.

The critical nature of marine propulsion and the relatively complex structure of cycloidal propulsion units, as compared to conventional propeller propulsion, has induced the need to improve the serviceability of cycloidal marine propulsion units. In addition, the new applications for the use of marine vessels equipped with electrical cycloidal marine propulsion units has further increased the requirements for reliability.

SUMMARY

An object of the present disclosure is to provide a cycloidal marine propulsion unit having improved serviceability and reliability. A further object of the present disclosure is to provide a marine vessel provided with such a marine propulsion unit.

The object of the disclosure is achieved by the marine propulsion unit and the marine vessel which are characterized by what is stated in the independent claims. The preferred embodiments of the disclosure are disclosed in the dependent claims.

The disclosure is based on the idea of providing a hollow rotary casing, in the inner space of which the at least a part of the blades shaft portions are received. Moreover, the hollow rotary casing is rotated by an outer circumference thereof with a power transmission engaging said outer circumference.

An advantage of such an arrangement is that the critical components associated to the blades are located within the hollow rotary casing and enables maintenance access to the inner space of the hollow rotary casing from the hull of the associated marine vessel. Such accessibility improves the serviceability of the marine propulsion unit, and consequently, also increases the reliability thereof.

BRIEF DESCRIPTION OF THE DRAWINGS

In the following the disclosure will be described in greater detail by means of preferred embodiments with reference to the accompanying drawings, in which.

DETAILED DESCRIPTION

According to a first aspect of the present disclosure, a cycloidal marine propulsion unit 1 is provided.

The cycloidal marine propulsion unit comprises a hollow rotary casing 2 having a central axis 2a. The rotary casing 2 further defines a central inner space 2b with an opening 2c at an axial end thereof. The hollow rotary casing 2 may be formed as an integral structure rotatable as one, and enclosing said central inner space 2b at least by the circumference of said structure. Preferably, the central inner space 2b extends from the opening 2c in the direction of the central axis 2a outwardly from the hull 4, when in use. It should be noted however, that the opening 2c does not need to reside on the central axis 2a but may be radially offset therefrom.

Advantageously, the opening 2c is suitable for enabling maintenance access into the central inner space. That is, the opening 2c is suitably dimensioned to allow entrance for maintenance personnel. For example, the minimum diameter of the opening 2c may preferably be 50 cm, more preferably 75 cm, and most preferably 100 cm, in a direction transverse to the central axis 2a.

Advantageously, the central inner space is suitable for enabling maintenance operations therein. That is, for servicing components and equipment placed within the inner space 2b. Suitably, the central inner space comprises a portion of unobstructed space, preferably at a central region thereof, for enabling maintenance personnel to operate thereat.

For example, a minimum height of such a portion of unobstructed space may preferably be 80 cm, more preferably 100 cm, and most preferably 120 cm, in a direction of the central axis 2a. For example, a minimum diameter of such a portion of unobstructed space may preferably be 80 cm, more preferably 100 cm, and most preferably 120 cm, in a direction transverse to the central axis 2a. The cycloidal marine propulsion unit 1 further comprises a mounting body 3 for supporting the rotary casing 2 on a hull 4 of a marine vessel such that the rotary casing 2 is rotatable about said central axis 2a with respect to the hull 4, and such that the opening 2c of the rotary casing is positioned within, and opens towards the hull 4, when in use. Moreover, the mounting body 3 suitably enables the thrust generated by the cycloidal marine propulsion unit 1 to be transmitted to the hull 4 of the marine vessel. Suitably, the mounting body 3 is fixed, or detachably fixed to the hull 4.

The cycloidal marine propulsion unit 1 further comprises a rotating arrangement 5 for rotating said hollow rotary casing 2.

The cycloidal marine propulsion unit 1 further comprises a plurality of blades 6 extending axially from the rotary casing 2 away from the hull 4, when in use, for rotation with the rotary casing 2 about the central axis 2a, wherein each blade 6 is mounted for pivotal movement with respect to the rotary casing 2, about respective blade axes 6a. Preferably, the blade axes 6a are generally parallel, i.e. parallel or near parallel to the central axis 2a. It should be noted, that the blade axes 6a may deviate, for example by ±5 deg, from parallel with the central axis 2.

Particularly, the rotating arrangement 5 is configured to rotate the rotary casing 2 by a circumference thereof. That is, the rotating arrangement 5 engages the rotary casing 2 by a circumference thereof. Preferably, the rotating arrangement 5 is configured to rotate the rotary casing 2 by an outer circumference thereof. Alternatively, the rotating arrangement 5 may be configured to rotate the rotary casing 2 by an inner circumference thereof Notably, the rotating arrangement 5 comprises a power transmission engaging the outer circumference of the hollow rotary casing 2. As opposed to rotating arrangement of conventional cycloidal propulsion units having a solid or closed shaft extending from a rotary disk, the construction of the rotating arrangement 5 according to the present disclosure enables access to the inner space 2b of the rotating casing 2 from the hull 4 of the associated marine vessel.

Moreover, a blade shaft portion 6b of each blade 6 is at least partly received within the central inner space 2b so as to attach said blade 6 to the rotary casing 6. This ensures that the critical components associated to the blades 6, such as actuators and bearings, may be accessed for service from the inner space 2b of the rotary casing 2.

In an embodiment of the first aspect according to the present disclosure, the power transmission of the rotating arrangement 5 comprises a mechanical power transmission 5a between a prime mover and the outer circumference of the hollow rotary casing 2. That is, rotating movement of the rotary casing 2 is achieved by mechanical interaction of the rotating arrangement 5 and the rotary casing 2. Suitably, the prime move may then be an electric motor or an internal combustion engine, for example.

In another embodiment of the first aspect according to the present disclosure, the power transmission of the rotating arrangement 5 comprises a direct drive electric motor 5b. In such a case, a rotor 5b' is fixed to and surrounds an outer circumference of the rotary body, and respectively, a stator 5b" is fixed with respect to the hull 4, so as to surround the rotor 5b'. Such a construction enables electromagnetic power transmission between the stator and rotor.

Preferably, but not necessarily, an annular gap between the rotor 5b' and stator 5b" is in fluid communication with surrounding water, when in use. This ensures that sufficient cooling of the direct drive electrical motor is achieved by the surrounding water, further contributing to improved reliability of the cycloidal marine propulsion unit by removing the need for separate cooling arrangements requiring periodical maintenance.

In a further embodiment of the first aspect according to the present disclosure, the mounting body 3 comprises a main bearing arrangement 7 for enabling rotation motion between the rotary casing 2 and the hull 4. In addition, the main bearing arrangement 7 transmits thrust generated by the cycloidal marine propulsion unit 1 to the hull 4 of the marine vessel via the mounting body 3.

The main bearing arrangement 7 comprises a king pin 7a extending downwardly, when in use, from the mounting body 3. Preferably, but not necessarily, the king pin 7a being preferably hollow.

The main bearing arrangement 7 further comprises an inner bearing ring fixed with respect to the hull 4 so as to and surround an outer circumference of the king pin 7a. Suitably, the inner bearing ring may be fixed to the king pin 7a. The main bearing arrangement 7 also comprises an outer bearing ring fixed to an inner circumference of the hollow rotary casing 2, so as to surround the inner bearing ring.

Preferably, but not necessarily, the main bearing arrangement 7 is arranged at least partially at a different level along the central axis 2a of the rotary casing 2 with respect to the rotating arrangement 5 and blade shaft portions 6b. Such a construction enables sufficient room for both accessing the inner space 2 of the rotary casing, and servicing components therein, thus contributing to improved reliability of the cycloidal marine propulsion unit.

Any suitable bearing configurations, such as sliding bearings, ball bearings, roller bearings, tapered roller bearing, or any combination thereof, may be used.

In an alternative embodiment of the first aspect according to the present disclosure, the mounting body 3 comprises a main bearing arrangement 7 for enabling rotation motion between the rotary casing 2 and the hull 4. In addition, the main bearing arrangement 7 transmits thrust generated by the cycloidal marine propulsion unit 1 to the hull 4 of the marine vessel via the mounting body 3.

The main bearing arrangement 7 comprises an inner ring fixed to, and surrounding, an outer circumference of the rotary casing 2, and an outer ring fixed with respect to the hull 4, so as to surround the inner ring. Suitably, the outer ring may be fixed to the mounting body 3.

Preferably, but not necessarily, the main bearing arrangement 7 is preferably arranged at least partially at a different level along the central axis 2a of the rotary casing 2 with respect to the rotating arrangement 5 and blade shaft portions 6b. Such a construction enables sufficient room for both accessing the inner space 2 of the rotary casing, and servicing components therein, thus contributing to improved reliability of the cycloidal marine propulsion unit.

Any suitable bearing configurations, such as sliding bearings, ball bearings, roller bearings, tapered roller bearing, or any combination thereof, may be used.

Preferably, but not necessarily, the main bearing arrangement 7 is water lubricated. Most suitably, the main bearing arrangements is in fluid communication with surrounding water, when in use. Such a construction would further increase the reliability of the cycloidal marine propulsion unit 1 by eliminating the need for seals associated to the main bearing, requiring periodic maintenance.

In yet a further embodiment of the first aspect according to the present disclosure, the cycloidal marine propulsion unit 1 comprises a main sealing arrangement 8 for preventing surrounding water from entering between the rotary casing 2 and the hull 4 above a predetermined level along the central axis 2a. Most suitably, the main sealing arrangement 8 being arranged surrounding an outer circumference of the rotary casing 2.

For example, the main sealing arrangement could be provided below the main bearing arrangement 7 and/or rotating arrangement, in order to prevent surrounding water from entering the main bearing arrangement 7. Alternatively, the main sealing arrangement could be provided above the main bearing arrangement 7 and/or rotating arrangement 5 in order to allow lubrication and cooling thereof, respectively. Nevertheless, the main sealing arrangement 8 should be provided below the opening 2c of the hollow rotary casing 2 to prevent surrounding water from entering the hull 4 and the inner space 2b of the rotary casing 2.

Preferably, but not necessarily, the main sealing arrangement 8 is configured such that it is replaceable from an inside of the hull 4 of the marine vessel. This may be achieved, for example, by providing the mounting body 3 with an annular recess 3a at a position facing the circumference of the rotary casing 2, into which an annular sealing member 8a is received so as to seal an annular clearance between the mounting body 3 and the rotary casing 2. This annular recess 3a should be open towards an axial direction so as to enable removal and insertion of the sealing member 8a into the recess 3a. The sealing member may then be further secured into the recess 3a by a backing plate attached to the mounting body so as to partially cover the recess 3a in the axial direction. Preferably, the sealing member 8a may be provided as one or more segments, the ends of which are attached to each other during installation so as to form a continuous closed annular sealing member 8a. In a similar manner, also the backing plate 8b may be provided as one or more segments.

Preferably, but not necessarily, the main sealing arrangement 8 is located at a different level along the central axis 2 of the rotary casing 2 with respect to the rotating arrangement 5 and shaft portions 6b, preferably below the main bearing arrangement 7 and the rotating arrangement 5, when in use.

Alternatively, the main sealing arrangement could be provided above the main bearing arrangement 7/and or rotating arrangement 5 in order to allow lubrication and cooling thereof, respectively.

Nevertheless, the main sealing arrangement 8 should be provided below the opening 2c of the hollow rotary casing 2 to prevent surrounding water from entering the hull 4 and the inner space 2b of the rotary casing 2.

In another embodiment of the first aspect according to the present disclosure, the blade shaft portions 6b and the rotating arrangement 5 are arranged at least partially at different levels along the central axis 2a of the rotary casing 2. Such configuration enables, the rotating arrangement 5 to be accessible for maintenance.

In yet another embodiment of the first aspect according to the present disclosure, each blade 6 is equipped with a separate respective blade actuator 9 for actuating said pivotal movement, wherein said blade actuator 9 is arranged within the central inner space of the rotary casing. Such configuration enables the blade actuators 9 to accessible for maintenance via the central inner space 2b.

Preferably, but not necessarily, each blade actuator 9 is an electric motor operationally coupled to a separate respective power converter 10 for driving said blade actuator. More preferably, but not necessarily, each separate respective power converter 10 is arranged within the central inner space 2b of the rotary casing 2.

In a further embodiment of the first aspect according to the present disclosure, the cycloidal marine propulsion unit 1 comprises a rotary coupling arrangement 11 for operationally coupling a power supply 12, located within the hull 4 of the marine vessel, with each of the blade actuators 9 within the rotary casing 2. Moreover, the rotary coupling arrangement 11 is at least partly arranged within the central inner space 2b of the rotary casing 2.

Such construction enables the rotary coupling arrangement 11 to be accessible for maintenance via the central inner space 2b.

It should be noted, that particularly in the case of blade actuators 9 provided as electric motors, the power supply 12 may be operationally coupled with the rotary coupling arrangement 11 either directly, or via a power converter 10.

In still a further embodiment of the first aspect according to the present disclosure, each blade shaft portion 6b is at least partially surrounded by a blade housing 13, such that a blade portion 6c of each blade 6 being outside of the blade housing 13, wherein the blade housing 13 is at least partly within the central inner space 2b.

Preferably, but not necessarily, a blade bearing arrangement 14 is configured between each of the blade shaft portion 6b and blade housing 13 for enabling said pivotal movement of said blade 6. Particularly, the blade bearing arrangement 14 is at least partly within the central inner space 2b of the rotary casing 2. This enables maintenance access to the blade bearing arrangement 14 from the central inner space 2b.

Preferably, but not necessarily, each blade housing 13 comprises a blade attachment flange 13a for releasably attaching the blade 6 with the rotary casing 2, such that the blade attachment flange 13a is located within the central inner space 2b. This enables that the attachment of each blade 6 to the rotary casing 2 may be done from the central inner space 2b.

In another embodiment of the first aspect according to the present disclosure, the cycloidal marine propulsion unit 1 comprises a hatch 15 for enabling access into the central inner space 2b, said hatch 15 being arranged on an outer surface of the rotary casing 2 facing away from the hull 4, when in use. Such an arrangement enables further access to the central inner space, e.g. for divers.

It should be noted, that the first aspect of the present disclosure encompasses any combination of one or more embodiments discussed above, including any variants thereof, in accordance with the appended Claims.

According to a second aspect of the present disclosure a marine vessel is provided. Particularly, the marine vessel comprises the cycloidal marine propulsion unit 1 according to the first aspect of the present disclosure.

It should be noted, that the marine vessel may comprise more than one, for example two, such marine propulsion units 1.

Figure 1:
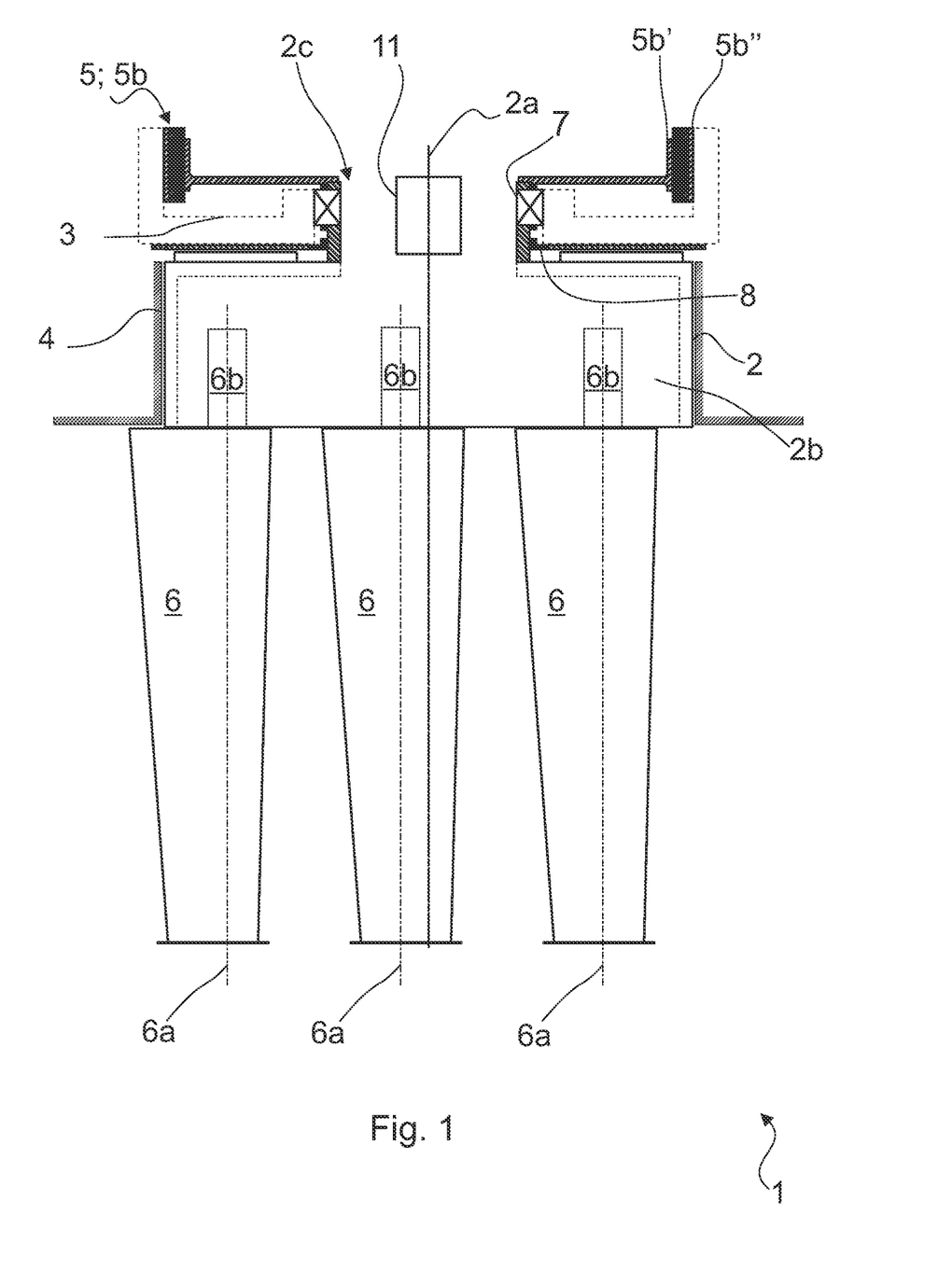
FIGS. 1-3 schematically illustrate alternative cycloidal marine propulsion units according to various embodiments of the present disclosure as cut views.

FIG. 1 schematically illustrates a marine propulsion unit 1 according to an embodiment of the present disclosure as a cut view. Particularly, the central inner space 2b of the rotary casing 2, supported within the hull 4 of a marine vessel with a mounting body 3 equipped with a main bearing arrangement 7, is shown. Moreover, the rotary casing 2 is rotatable about its central axis 2a.

A main sealing arrangement 8 is provided below the main bearing arrangement 7 for preventing surrounding water from entering the main bearing arrangement 7 and the inside of the hull 4.

In the embodiment of FIG. 1, the rotating arrangement 5 has a direct drive electric motor 5b having electromagnetic power transmission between a stator thereof, fixed with respect to the hull, and the rotor thereof, attached to the outer circumference of the rotary casing 2.

The marine propulsion unit 1 further comprises a plurality of blades 6 extending longitudinally away from the rotary casing 2 and the hull 4. Each of the blades 6 is pivotable about their respective blade axis 6a and has a blade shaft portion 6b arranged within the central inner space 2b of the rotary casing 2.

In addition, FIG. 1 schematically illustrates a rotary coupling unit 11 positioned within the central inner space 2b of the rotary casing 2.

Figure 2:
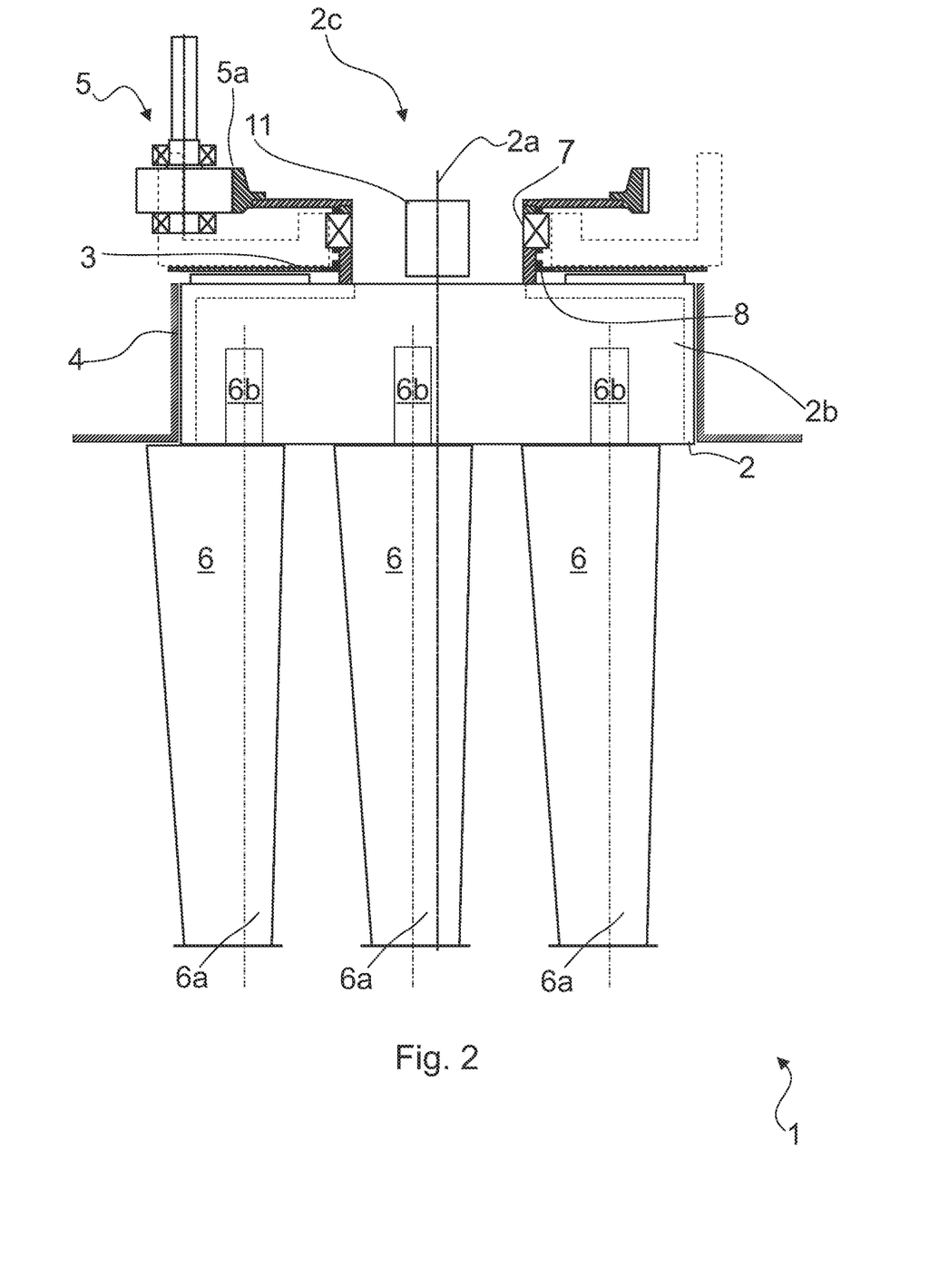

FIG. 2 schematically illustrates a marine propulsion unit 1 according to an embodiment of the present disclosure as a cut view. Particularly, the embodiment of FIG. 2 is similar to that of FIG. 1 with the exception of rotating arrangement 5 having mechanical power transmission engaging the outer circumference of the rotary casing 2. Namely, the rotating arrangement 5 comprises two operationally coupled externally toothed gears, one being provided on the outer circumference of the rotary casing 2, and the other being provided on an input shaft. In the embodiment of FIG. 2 the input shaft is generally parallel with the central axis 2a of the rotary casing 2. The input shaft may then be rotated by any suitable prime mover, such as an electric motor or a combustion engine, either directly or via additional transmission means.

Figure 3:
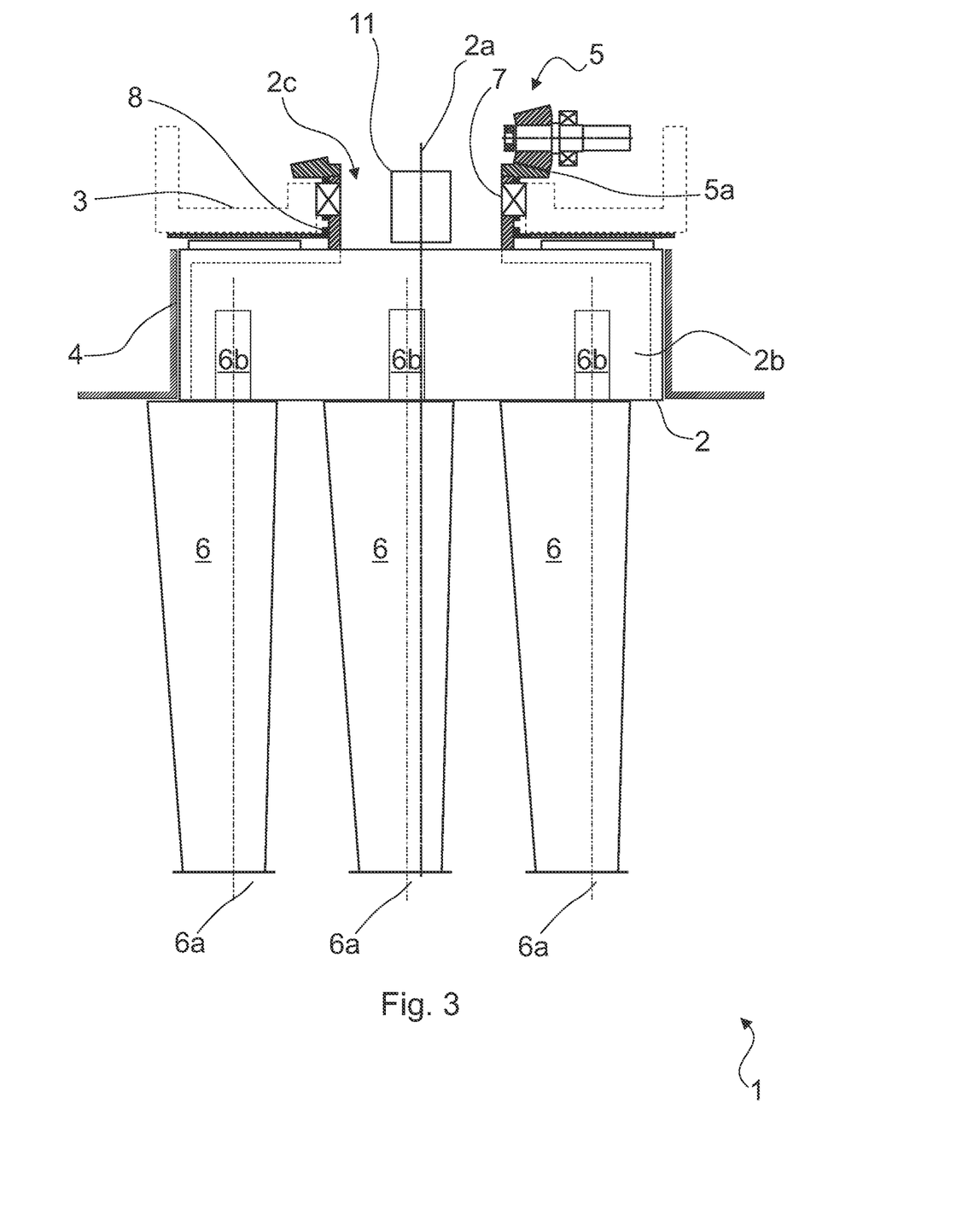

FIG. 3 schematically illustrates a marine propulsion unit 1 according to an embodiment of the present disclosure as a cut view. Particularly, the embodiment of FIG. 3 is similar to that of FIG. 2 with the exception of the rotating arrangement 5 comprising a bevel gear configuration such that the input shaft is generally perpendicular with respect to the central axis 2a of the rotary casing 2.

Figure 4:
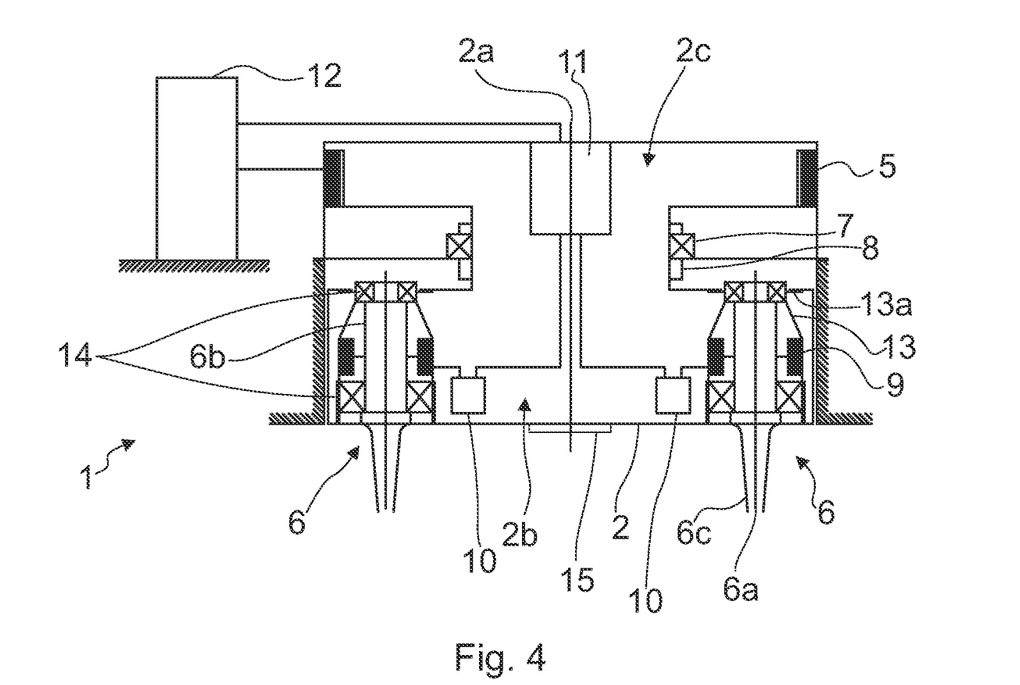
FIG. 4 and FIG. 5 schematically illustrate alternative power transmission arrangements for cycloidal marine propulsion units according to various embodiments of the present disclosure, and FIGS. 6-9 schematically illustrate alternative support arrangements for cycloidal marine.

FIG. 4 schematically illustrates a power transmission arrangement of a cycloidal marine propulsion unit 1 according to an embodiment of the present disclosure, namely the embodiment of FIG. 1.

The rotating arrangement 5 of the cycloidal marine propulsion unit 1 of FIG. 4 comprises a direct-drive electrical motor arranged around the outer circumference of the rotary casing 2. A power supply 12, located within the hull 4 of a marine vessel, is operationally coupled to this direct-drive electric motor, for rotating the rotary casing 2.

A rotary coupling arrangement 11, arranged at least partially within the central inner space 2b, operationally couples the power supply 12, located within the hull 4, i.e., not within the central inner space 2c, with each of the blade drives 9 via respective power converters 10, both of which are also arranged within the central inner space 2b.

Particularly, each of the blades 6 are provided as units comprising a blade housing 13, in which each respective blade shaft portion 6b is at least partially received and supported by a blade bearing arrangement 14, while the blade portion 6c resides outside of the blade housing 13. The blade drive 9 is provided as a direct-drive electric motor arranged between two bearings of the blade bearing arrangement 14. The direct-drive electric motor of the blade drive 9 are configured such that a stator is fixed with respect to the blade housing 13, so as to surround a rotor fixed to the outer circumference of the blade shaft portion 6b. Moreover, the blade housing 13, comprises an attachment flange 13a for releasably attaching the blade with the rotary casing 2. Notably, the attachment flange 13a fixes the blade 6 to the rotary casing at the inner central space 2b thereof.

Figure 5:
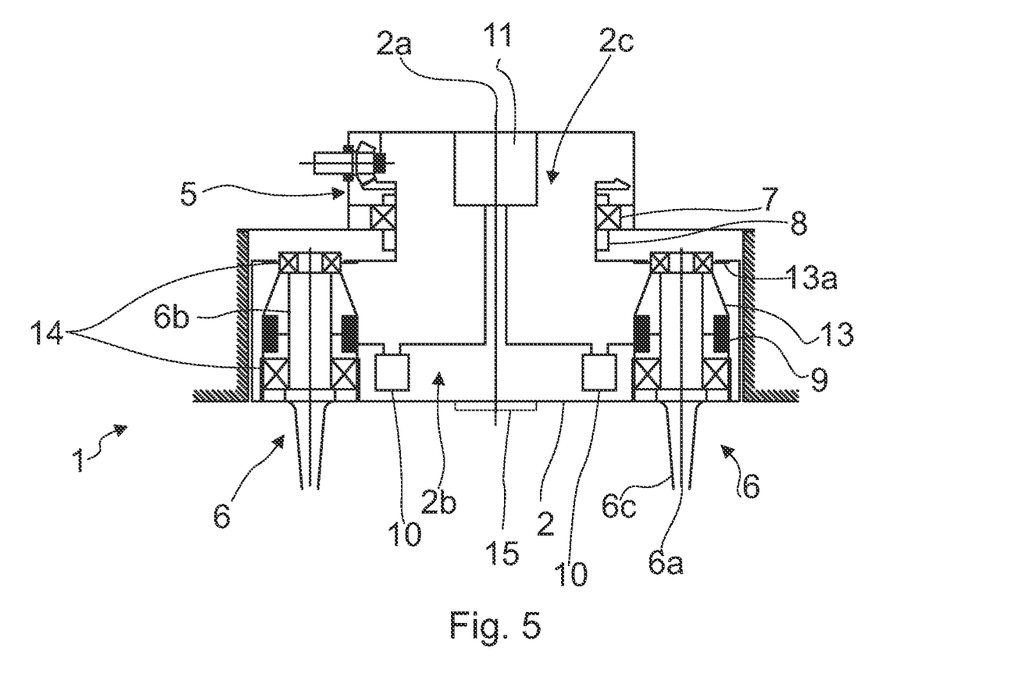

FIG. 5 schematically illustrates a power transmission arrangement of a cycloidal marine propulsion unit 1, according to an embodiment of the present disclosure, namely the embodiment of FIG. 3.

As opposed to FIG. 4, the rotating arrangement 5 of FIG. 5 comprises a bevel gear configuration, in which a bevel-toothed gear surrounding the rotary casing 2 engages with another bevel-toothed gear fixed to an input shaft having generally perpendicular axis as compares to the central axis 2a of the rotary casing 2. Although not shown in FIG. 5, a power source is coupled to the power converters 10 associated to the blade drives 9 via the rotary coupling arrangement 11.

Figure 6:
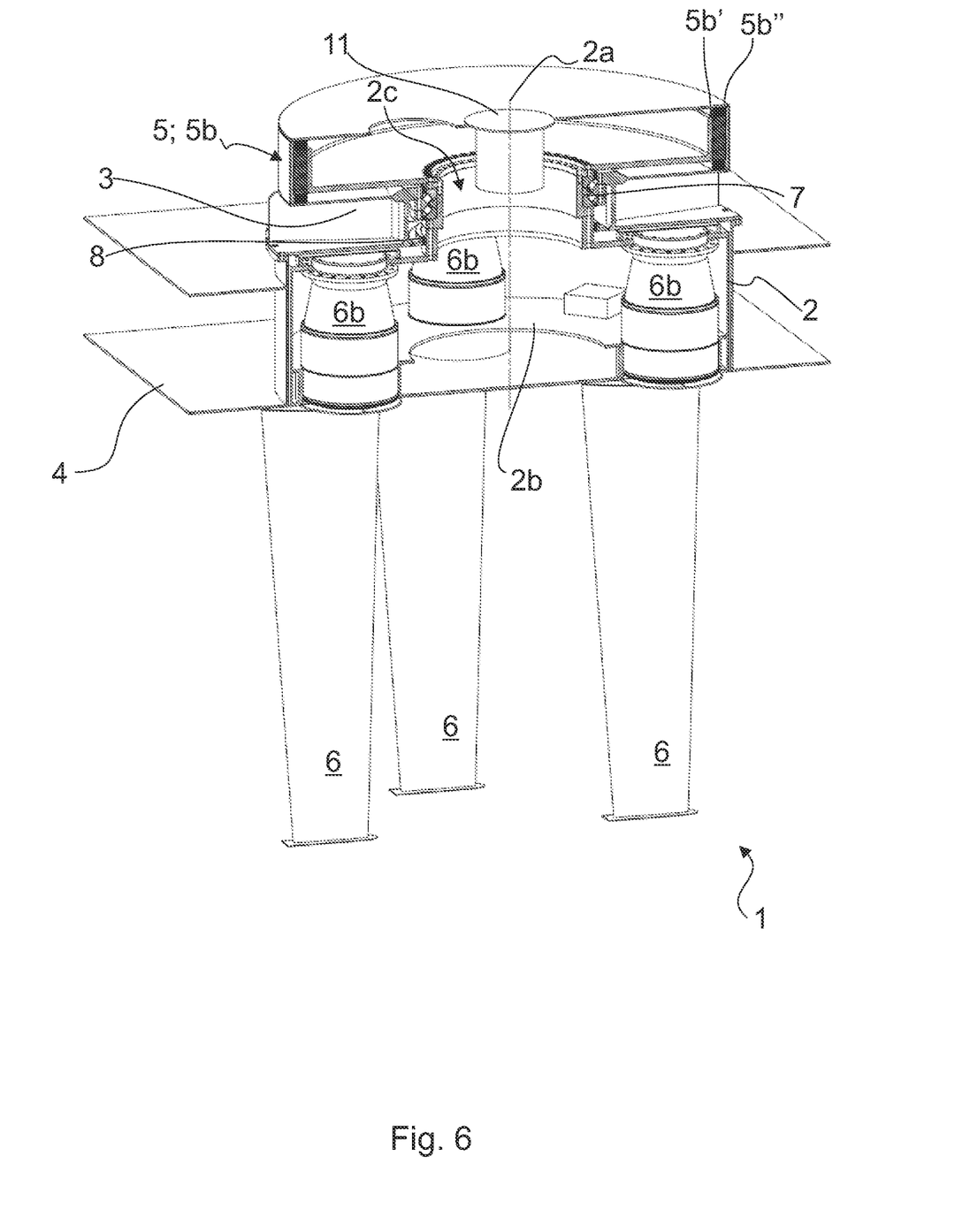

FIG. 6 schematically illustrates a support arrangement for a cycloidal marine propulsion unit 1 according to an embodiment according to the present disclosure, shown as a perspective partial cut-view.

Particularly, the rotary casing 2 is rotatably supported on the hull 4 of the marine vessel with the mounting body 3 equipped with the main bearing arrangement 7 having a double-row tapered roller bearing. The main bearing arrangement 7 is situated along the central axis 2a of the rotary casing at a position having a reduced diameter, as compared to the positions of the rotating arrangement 5 and the blade shaft portions 6b. Also, a main sealing arrangement 8 is provided below the main bearing arrangement 7 so as to preventing surrounding water from entering the main bearing arrangement 7 and the inside of the hull 4.

The rotary coupling arrangement 11 can be seen provided on the central axis 2a. At a same level along the central axis 2a, the rotating arrangement has been provided as a direct-drive electric motor having a rotor 5b' fixed to and surrounding an outer circumference of the rotary casing, and a stator 5b" fixed with respect to the mounting body 3.

At an axial end of the rotary casing 2 towards the hull 4, the opening 2c provides access into the central inner space 2c, as indicated by the arrow in FIG. 6.

Figure 7:
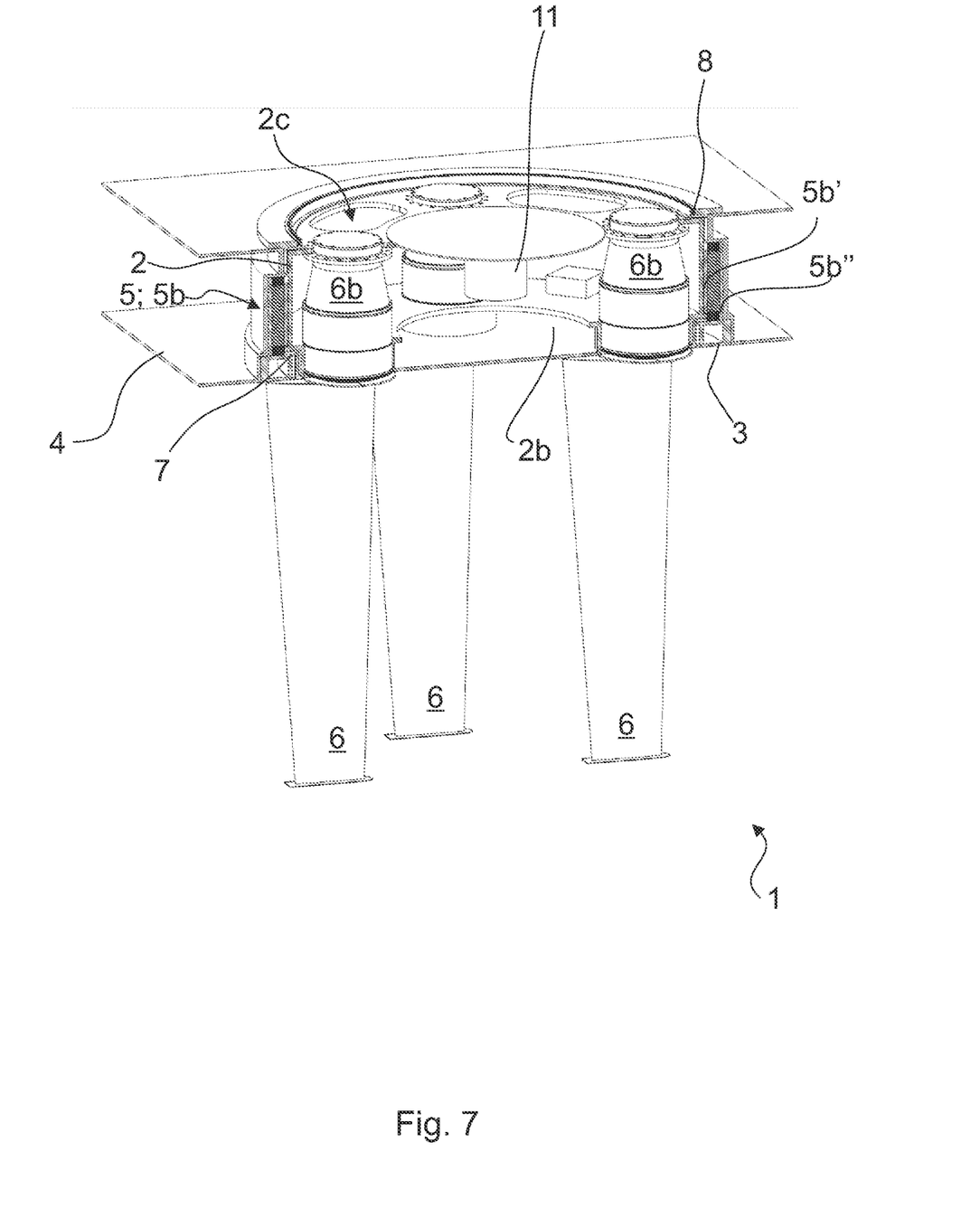

FIG. 7 schematically illustrates an alternative support arrangement for a cycloidal marine propulsion unit 1 according to another embodiment according to the present disclosure, shown as a perspective partial cut-view. Particularly, as opposed to the configuration shown in FIG. 6, the mounting body 3 is provided as a bushing for rotatably attaching the rotary casing to the hull 4, and at the same time, providing the main bearing arrangement 7 as sliding bearing between the bushing and a corresponding groove formed on the outer circumference of the rotary casing 2. As can be seen, the main bearing arrangement 7 is in fluid communication with the outside of the hull, i.e. with the surrounding water, when in use, thereby providing lubrication for the main bearing arrangement 7. In addition, also the annular gap between the rotor 5b' and stator 5b" of the direct-drive electric motor of the rotating arrangement is in fluid communication with the surrounding water, when in use, thereby providing cooling for rotating arrangement. A sealing arrangement 8 is provided between the annular clearance between the rotary casing 2 and the hull 4 at a level above the rotating arrangement 5 along the central axis 2a.

Figure 8:
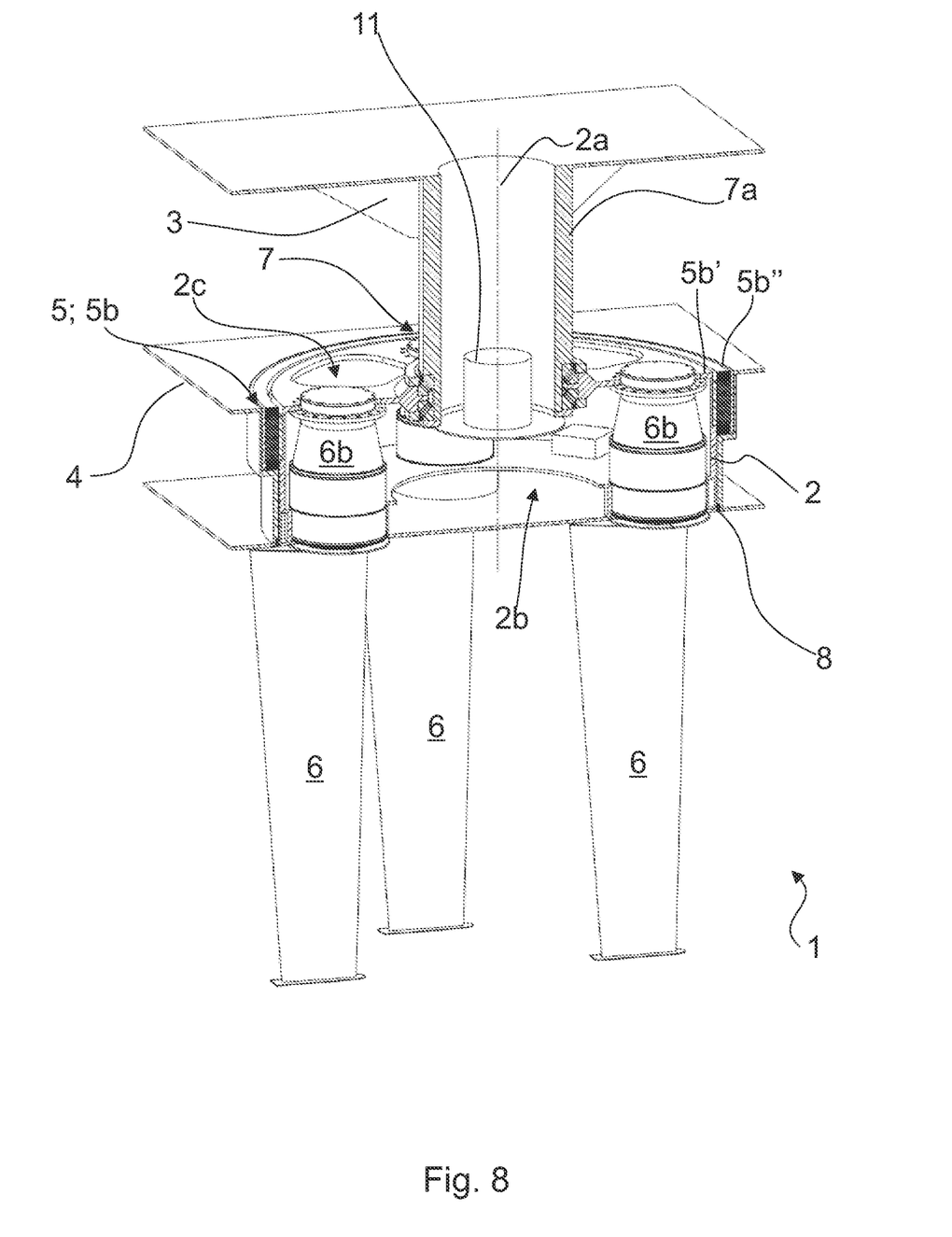

Openings 2c at the hull-side axial end of the rotary casing 2 provide access into the central inner space 2b. FIG. 8 schematically illustrates another alternative support arrangement for a cycloidal marine propulsion unit 1 according to a further embodiment according to the present disclosure, shown as a perspective partial cut-view. Particularly, the mounting body 3 comprises a king pin 7a extending downwardly within the hull 4 along the central axis 2a of the rotary casing 2. Moreover, the king pin 7a extends partially into the central inner space 2a of the rotary casing 2, while the rotary casing 2 is rotatably attached to the king pin 7a with a bearing, namely a double-row tapered roller bearing, by its hull-side axial end. That is, as opposed to the configurations of FIGS. 6 and 7, the rotary casing is supported by the mounting body 3 internally.

Moreover, the openings 2c, provided on the hull-side axial end of the rotary casing radially at a distance from the central axis 2a, enables access into the central inner space 2b.

The main sealing arrangement 8 is provided at a level along the central axis 2a below the rotating arrangement 5b′, 5b″.

The king pin 7a, is provided as hollow cylindrical body, enabling the rotary coupling arrangement 11 to be positioned within the hollow inside of the king pin 7a.

Although FIGS. 6-8 show the rotating arrangement 5 provided as a direct-drive electric motor 5b, it should be noted that other rotary arrangements 5, such as mechanical power transmission could be used.

Figure 9:
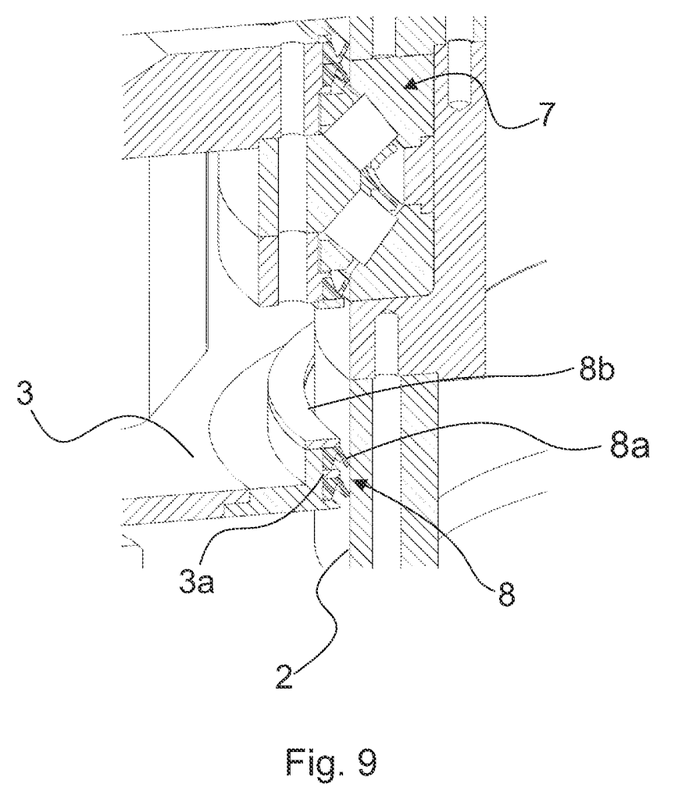

FIG. 9 schematically illustrates a detailed view of the main sealing arrangement 8 of FIG. 6. Particularly, the mounting body 3 is provided with an annular recess 3a at a position facing the circumference of the rotary casing 2, into which an annular sealing member 8a is received so as to seal an annular clearance between the mounting body 3 and the rotary casing 2. This annular recess 3a is towards an axial direction so as to enable removal and insertion of the sealing member 8a into the recess 3a. In the particular arrangement of FIG. 9, the recess open upwards. The sealing member is further secured into the recess 3a by a backing plate 8b attached to the mounting body so as to partially cover the recess 3a in said axial direction. Preferably, the sealing member 8a may be provided as one or more segments, the ends of which are attached to each other during installation so as to form a continuous closed annular sealing member 8a. In a similar manner, also the backing plate 8b may be provided as one or more segments.

The invention claimed is:

1. A cycloidal marine propulsion unit comprising:
   a hollow rotary casing having a central axis, said rotary casing defining a central inner space with an opening at an axial end thereof;
   a mounting body for supporting the rotary casing on a hull of a marine vessel such that the rotary casing is rotatable about said central axis with respect to the hull, and such that the opening of the rotary casing is positioned within, and opens towards the hull, when in use;
   a rotating arrangement for rotating said hollow rotary casing;
   a plurality of blades extending axially from the rotary casing away from the hull, when in use, for rotation with the rotary casing about the central axis, wherein each blade is mounted for pivotal movement with respect to the rotary casing, about respective blade axes
   wherein the rotating arrangement is configured to rotate the rotary casing by a circumference thereof, said rotating arrangement including a power transmission engaging the outer circumference of the hollow rotary casing,
   wherein a blade shaft portion of each blade is at least partly received within the central inner space so as to attach said blade to the rotary casing,
   wherein each blade is equipped with a separate respective blade actuator for actuating said pivotal movement, wherein said blade actuator is arranged within the central inner space of the rotary casing,
   wherein each blade actuator is an electric motor operationally coupled to a separate respective power converter for driving said blade actuator, and
   wherein the opening is dimensioned to allow entrance for maintenance personnel.

2. The cycloidal marine propulsion unit according to claim 1, wherein the power transmission comprises a mechanical power transmission between a prime mover and the outer circumference of the hollow rotary casing.

3. The cycloidal marine propulsion unit according to claim 1, wherein the power transmission comprises a direct drive electric motor having an electromagnetic power transmission between:
   a rotor fixed to and surrounding an outer circumference of the rotary casing, and
   a stator fixed with respect to the hull, so as to surround the rotor.

4. The cycloidal marine propulsion unit according to claim 3, wherein an annular gap between the rotor and stator is in fluid communication with surrounding water, when in use.

5. The cycloidal marine propulsion unit according to claim 1, wherein the mounting body comprises a main bearing arrangement for enabling rotation motion between the rotary casing and the hull, said bearing arrangement comprising:
   a king pin extending downwardly, when in use, from the mounting body, said king pin being preferably hollow;
   an inner bearing ring fixed with respect to the hull so as to and surround an outer circumference of the king pin, and
   an outer bearing ring fixed to an inner circumference of the hollow rotary casing, so as to surround the inner ring,
   wherein the main bearing arrangement is preferably arranged at least partially at a different level along the central axis of the rotary casing with respect to the rotating arrangement and blade shaft portions.

6. The cycloidal marine propulsion unit according to claim 1, wherein the mounting body comprises a main bearing arrangement for enabling rotation motion between the rotary casing and the hull, said bearing arrangement comprising:
   an inner ring fixed to, and surrounding, an outer circumference of the rotary casing, and
   an outer ring fixed with respect to the hull, so as to surround the inner ring,
   wherein the main bearing arrangement is preferably arranged at least partially at a different level along the central axis of the rotary casing with respect to the rotating arrangement and blade shaft portions.

7. The cycloidal marine propulsion unit according to claim 6, wherein the main bearing arrangement is water lubricated, wherein said main bearing arrangement is in fluid communication with surrounding water, when in use.

8. The cycloidal marine propulsion unit according to claim 1, further comprising a main sealing arrangement for preventing surrounding water from entering between the rotary casing and the hull above a predetermined level along the central axis, said main sealing arrangement being arranged surrounding an outer circumference of the rotary casing.

9. The cycloidal marine propulsion unit according to claim 8, wherein the main sealing arrangement is replaceable from an inside of the hull of the marine vessel.

10. The cycloidal marine propulsion unit according to claim 8, wherein the main sealing arrangement is located at a different level along the central axis of the rotary casing with respect to the rotating arrangement and shaft portions, preferably below the main bearing arrangement and the rotating arrangement, when in use.

11. The cycloidal marine propulsion unit according to claim 1, wherein the blade shaft portions and the rotating arrangement are arranged at least partially at different levels along the central axis of the rotary casing.

12. The marine propulsion unit according to claim 1, wherein each separate respective power converter is arranged within the central inner space of the rotary casing.

13. The cycloidal marine propulsion unit according to claim 1, further comprising a rotary coupling arrangement for operationally coupling a power supply, located within the hull of the marine vessel, with each of the blade actuators within the rotary casing, wherein said rotary coupling arrangement is at least partly arranged within the central inner space of the rotary casing.

14. The cycloidal marine propulsion unit according to claim 1, wherein each blade shaft portion is at least partially surrounded by a blade housing, a blade portion of each blade being outside of the blade housing, wherein the blade housing is at least partly within the central inner space.

15. The cycloidal marine propulsion unit according to claim 14, further comprising a blade bearing arrangement being configured between each of the blade shaft portion and blade housing for enabling said pivotal movement of said blade, wherein the blade bearing arrangement is at least partly within the central inner space of the rotary casing.

16. The cycloidal marine propulsion unit according to claim 14, wherein each blade housing comprises a blade attachment flange for releasably attaching the blade with the rotary casing, wherein the blade attachment flange is located within the central inner space.

17. The cycloidal marine propulsion unit according to claim 1, further comprising a hatch for enabling access into the central inner space, said hatch being arranged on an outer surface of the rotary casing facing away from the hull, when in use.

18. A marine vessel, comprising a cycloidal marine propulsion unit including:

a hollow rotary casing having a central axis, said rotary casing defining a central inner space with an opening at an axial end thereof;

a mounting body for supporting the rotary casing on a hull of a marine vessel such that the rotary casing is rotatable about said central axis with respect to the hull, and such that the opening of the rotary casing is positioned within, and opens towards the hull, when in use;

a rotating arrangement for rotating said hollow rotary casing;

a plurality of blades extending axially from the rotary casing away from the hull, when in use, for rotation with the rotary casing about the central axis, wherein each blade is mounted for pivotal movement with respect to the rotary casing, about respective blade axes, wherein the rotating arrangement is configured to rotate the rotary casing by a circumference thereof, said rotating arrangement including a power transmission engaging the outer circumference of the hollow rotary casing, wherein a blade shaft portion of each blade is at least partly received within the central inner space so as to attach said blade to the rotary casing, wherein each blade is equipped with a separate respective blade actuator for actuating said pivotal movement, wherein said blade actuator is arranged within the central inner space of the rotary casing, wherein each blade actuator is an electric motor operationally coupled to a separate respective power converter for driving said blade actuator, and wherein the opening is dimensioned to allow entrance for maintenance personnel.

\* \* \* \* \*